United States Patent [19]

Howarth, Jr.

[11] Patent Number: 4,642,086
[45] Date of Patent: Feb. 10, 1987

[54] APPARATUS FOR FORMING FLEXIBLE FOLD LINES IN A THERMOPLASTIC SHEET

[75] Inventor: Robert A. Howarth, Jr., Ringwood, N.J.

[73] Assignee: Transparent Packaging Corp., Wood Ridge, N.J.

[21] Appl. No.: 759,879

[22] Filed: Jul. 29, 1985

[51] Int. Cl.$^4$ .............................................. B05B 1/14
[52] U.S. Cl. .................................... 493/341; 425/296; 425/307; 425/316; 425/394; 425/396; 493/355; 493/396; 493/470
[58] Field of Search ............... 493/355, 341, 396, 470; 425/396, 296, 307, 316, 394; 83/879, 883, 885

[56] References Cited

U.S. PATENT DOCUMENTS

| | | | |
|---|---|---|---|
| 3,271,560 | 9/1966 | Schott | 493/470 |
| 3,359,773 | 12/1967 | Stuchbery | 493/355 |
| 4,179,252 | 12/1979 | Seufert | 425/384 |
| 4,373,929 | 2/1983 | Smith | 493/396 |
| 4,386,925 | 6/1983 | Focke | 493/396 |

FOREIGN PATENT DOCUMENTS 2549774 2/1985 France .................. 493/341

*Primary Examiner*—Lowell A. Larson
*Assistant Examiner*—Robert Showalter
*Attorney, Agent, or Firm*—Ezra Sutton

[57] ABSTRACT

There is provided an improved apparatus for forming foldable box blanks from a thermoplastic sheet by forming flexible fold lines in the thermoplastic sheet, with the apparatus including a plurality of scoring tools and a flat plate having a plurality of grooves formed therein opposite to the scoring tools. In addition, the apparatus includes means for heating the scoring tools to less than the melting temperature of the thermoplastic sheet. In this manner, when the heated scoring tools engage the thermoplastic sheet, it is deformed on its upper surface by the scoring tools and on its lower surface by the grooves in the grooved plate to form a plastic sheet having the desired flexible fold lines.

8 Claims, 4 Drawing Figures

APPARATUS FOR FORMING FLEXIBLE FOLD LINES IN A THERMOPLASTIC SHEET

BACKGROUND OF THE INVENTION

This invention relates to an apparatus for forming flexible fold lines in a sheet of thermoplastic material and is particularly useful in making foldable box blanks. In this art, heat is applied to the thermoplastic sheet so that it is partially softened, and the thermoplastic sheet is deformed between two tools. During the forming process, fold lines or crease lines are formed in the thermoplastic sheet, and this makes it possible to bend the sheet about the fold line to form the blank into a box. It is desirable that such fold lines have no memory in returning to their flat configuration from a folded position.

There are a number of relevant prior art patents in this field. For example, U.S. Pat. No. 4,179,252 relates to an apparatus for forming flexible fold lines in a thermoplastic sheet. Such apparatus employs a high-frequency generator for creating a high-frequency electric field between an upper tool and a flat plate, so that the high-frequency electric field provides sufficient het to soften the thermoplastic sheet.

The drawbacks of such prior arrangements are that a costly high-frequency generator is required to heat the thermoplastic sheet, as well as cooling apparatus to cool the scoring tools. Such drawbacks hve been overcome by the present invention, since such costly apparatus is not required to form foldable boxes having flexible fold lines.

Broadly, it is an object of the present invention to provide an improved apparatus for forming plastic box blanks which overcomes the drawbacks of the prior art. Specifically, it is within the comtemplation of the present invention to provide an apparatus which is inexpensive, efficient, and provides a quality product.

It is a further object of the present invention to provide an apparatus which includes a grooved plate for receiving plastic within its grooves along the fold lines to form a plastic sheet having fold lines which include thick and thin areas for increased strength and flexibility.

BRIEF SUMMARY OF THE INVENTION

The present invention relates to an apparatus for forming foldable box blanks from a thermoplastic sheet by forming flexible fold ines in the thermoplastic sheet. The apparatus includes a plurality of scoring tools disposed above a grooved flat plate for supporting the thermoplastic sheet, which has an upper and lower surface. The flat grooved plate has a plurality of sets of grooves formed in the plate at various locations opposite to the plurality of scoring tools, and at the locations where the fold lines are to be formed. In addition, the apparatus includes means for heating the scoring tools to less than the melting temperature of the thermoplastic sheet. In this manner, when the scoring tools engage the thermoplstic sheet, the heat operates to soften the thermoplastic sheet, which is deformed on its upper surface by the scoring tools and which is deformed on its lower surface by the grooves in the grooved plate.

In the preferred embodiment, the grooved plate can be grooved on its upper and lower surfaces and thus be used for two different box configurations. In addition, although the grooves on the plate can be disposed at any angle in order to score the thermoplastic sheet, it has been found that the best results are obtained when the groove cuts are disposed at an angle of 45 degrees relative to the scoring tools. This provides the foldable crease lines with the greatest strength.

In addition, although the distance between the high points and the depth of the grooves in the grooved plate can be varied within a limited range, experimentation has shown that the best results are obtained when the grooves are 0.020 inches wide and 0.015 inches deep. Still further, in the preferred embodiment, the scoring tools are slightly shorter than the cutting tools, and preferably, there is a difference of 0.004 inches.

In operation, the high points on the grooves of the grooved plate create thin areas in the thermoplastic sheet when pressure is applied to the sheet from the heated scoring tools. The heat softens the thermoplastic sheet and allows the plastic material that is displaced by the pressure of the scoring tools to move into the valleys or low spots of the grooves on the plate which, in turn, creates thick areas on the thermoplastic sheet which are formed on the opposite side of the indentations made by the scoring tools.

Advantageously, as a result of the present invention, an apparatus is provided for efficiently and economically forming flexible fold lines in a thermoplastic sheet by a combination of heated scoring tools and a flat plate disposed below the scoring tools, with the flat plate having a plurality of corresponding grooves into which the softened plastic is displaced by the pressure of the scoring tools to form flexible fold lines having thin and thick areas which allow the thermoplastic sheet to be easily creased but still have sufficient strength along the crease lines or fold lines.

BRIEF DESCRIPTION OF THE DRAWINGS

Further objects, features, and advantages of the present invention will become apparent upon consideration of the detailed description of the presently-preferred embodiment, when taken in conjunction with the accompanying drawings, wherein.

DETAILED DESCRIPTION OF THE PREFERRED EMBODIMENT

Figure 1:
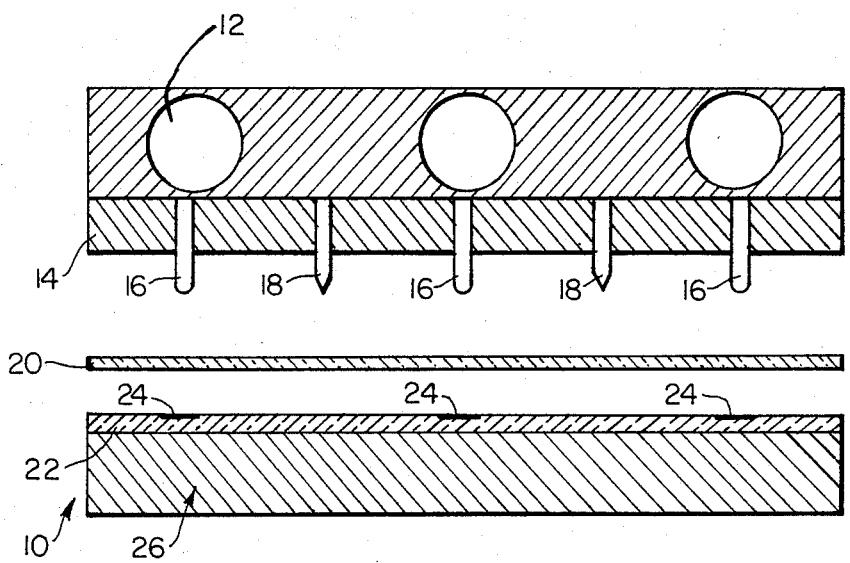
FIG. 1 is a cross-sectional view of the apparatus of the present invention.

Referring now to FIG. 1, there is shown an apparatus embodying the principles of the present invention, generally designated by the reference numeral 10. The apparatus includes a press having a heater 12 connected to a holding plate 14 on which a plurality of scoring tools or rules 16 and a plurality of cutting tools 18 are mounted. The heater 14 heats the scoring tools to just below the melting temperature of the thermoplastic sheet, which is approximately 290 degrees Fahrenheit, depending on the thickness and type of thermoplastic material used. the cutting tools 18 cut blanks of the desired shape out of the thermoplastic sheet 20, which is disposed on a grooved plate 22. The grooved plate 22 is supported on a holding frame 26 and includes a plurality of grooves 24, in a manner to be explained.

Figure 2:
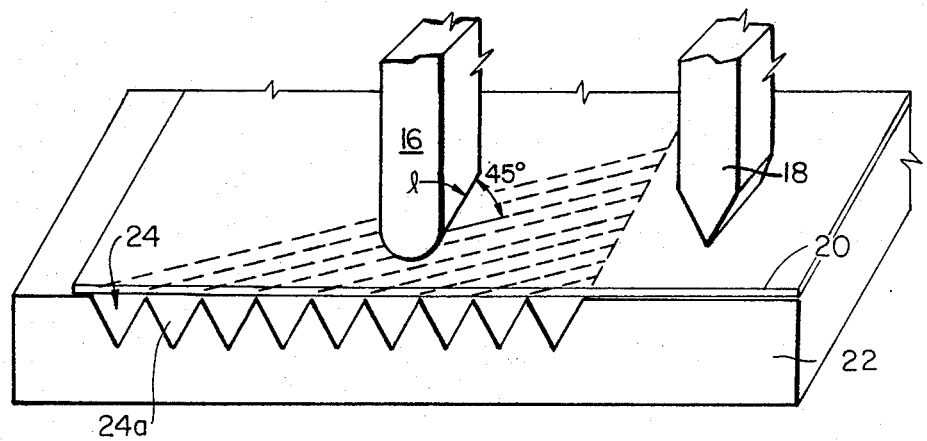
FIG. 2 is a cross-sectional view of the apparatus of the present invention shown in detail.
Figure 3:
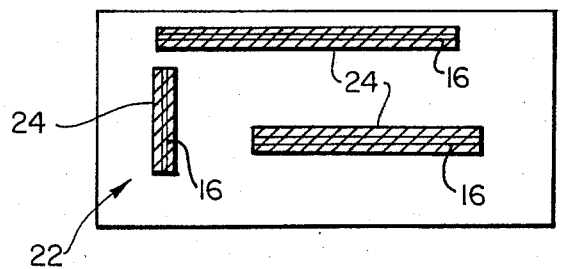
FIG. 3 is a top plan view of the grooved plate.

Referring to FIG. 3, there is shown a top view of the grooved plate 22 and the manner in which the sets of grooves 24 are disposed on the grooved plate 22. The three sets of grooves cooorespond to the three fold lines to be formed. The arrangement of grooves 24, shown in FIG. 3, is merely representative, and it should be understood that any layout or orientation of the grooves 24 is possible in accordance with the principles of the present invention. Basically, the grooves 24 are located and formed in those areas of the plate 22 in which the desired crease lines or fold lines of the blank are to be formed. In addition, the grooves 24 formed on the plate can extend at any angle to the plate 22 for the purpose of deforming the thermoplastic sheet 20. However, in accordance with the present invention, the best results have been obtained when the groove cuts are disposed at a 45 degree angle to he longitudinal axis 1 of the scoring tools 16 as shown in FIG. 2. With such an arrangement, it has been found that the fold lines have the best combination of strength and flexibility, and less heat and pressure is needed to deform the thermoplastic sheet 20 along the fold lines.

Referring, in particular, to FIG. 2, a set of grooves 24 for forming a fold line is shown in detail. As shown therein, in the preferred embodiment, the best results have been obtained when the width of the grooves or cuts 24a are 0.020 inches wide as measured from the top of one groove to the top of the adjacent groove. In addition, the preferred depth of each groove 24a is 0.015 inches deep. It has been found that these groove dimensions provide the best results on a wide range of different types and thicknesses of thermoplastic material.

In addition, in FIG. 2, the scoring tools 16 and cutting tools 18 are shown in detail. Preferably, the scoring tools are 0.004 inches shorter than the cutting tools in order to obtain the best results.

Figure 4:
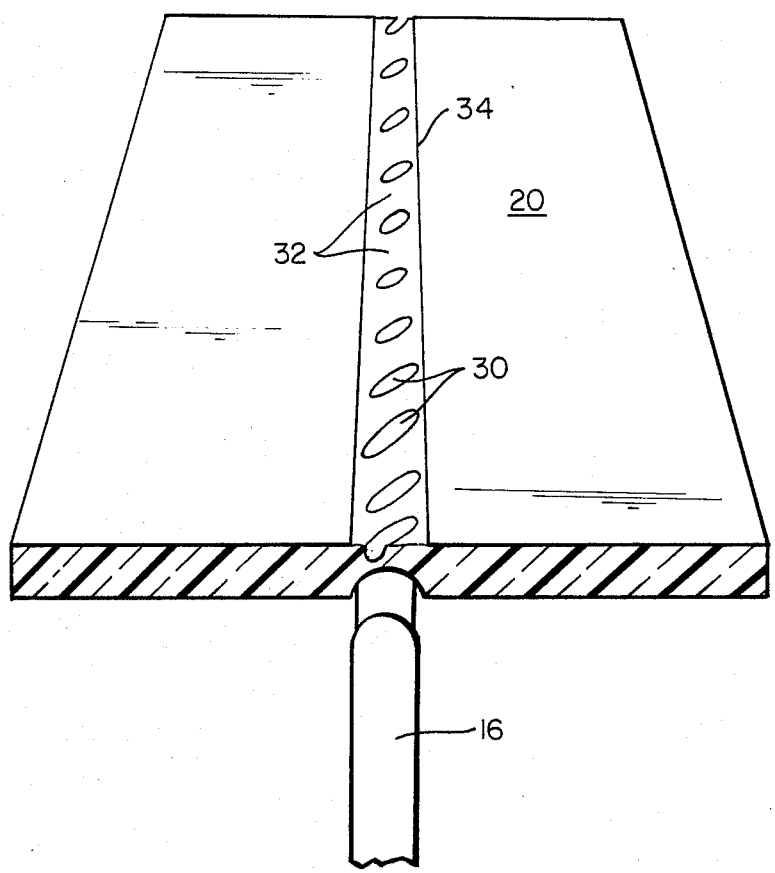
FIG. 4 is a detailed view of a thermoplastic sheet after it has been inaccordance with the present invention.

In operation, the heated scoring tools 16 and die cutting tools 18 are moved toward the grooved plate 22 and the thermoplastic sheet 20. Cutting tools 18 penetrate and completely cut through the sheet 20 to form the blank into the desired shape. The heated scoring tools 16 operate to partially penetrate and soften the thermoplastic sheet, while pressure is applied to both the upper and lower surfaces of the thermoplastic sheet. More particularly, the thermoplastic sheet 20 is deformed on its upper surface by the scoring tools 16 and is deformed on its lower surface by the grooves 24. In operation, as shown in FIG. 4, the high points on the grooves create thin areas 30 along the fold line 34 in the thermoplastic sheet. In addition, because the heated scoring tools 16 soften the plastic, it is displaced by the scoring tools, and the plastic moves into the low spots or valleys of the grooves 24. As a result, thickened areas or high spots 32 are formed on the plastic sheet along the fold line 34 on the opposite side of the identations made by the scoring tools 16. Such thin and thick areas 30 and 32 are shown in detail in FIG. 4 along the fold line 34.

In this manner, a flexible fold line is formed by each set of scoring tools and grooves, with such fold lines having a plurality of thin and thick areas which provide sufficient flexibility and strength to the box blank so that it may be easily folded. In the preferred embodiment, thin areas 30 make up about 5 to 10 percent of the original thickness of the plastic sheet, whereas thick areas 32 make up about 40 to 60 percent of the original thickness. The remaining portions of the fold line 34 are also reduced in thickness to varying degrees between the thick and thin areas of the fold line 34.

Advantageously, as a result of the present invention, a simple and efficient apparatus is provided for forming flexible fold lines in thermoplastic sheets without the need of complicated cooling apparatus and/or high-frequency generators, as in the prior art. The use of the grooves in the lower plate provides the required flexibility and strength along the fold lines.

A latitude of modification, change, and substitution is intended in the foregoing disclosure, and in some instances, some features of the invention will be employed without a corresponding use of other features. Accordingly, it is appropriate that the appended claims be construed broadly and in a manner consistent with the spirit and scope of the invention herein.

What is claimed is:

1. Apparatus for forming foldable box blanks from a thermoplastic sheet by forming flexible fold lines in the thermoplastic sheet which has an upper and lower surface, comprising:
   scoring means including a plurality of scoring tools each having a longitudinal axis;
   a flat plate disposed opposite to said scoring tools for supporting said thermoplastic sheet, said flat plate having a plurality of sets of grooves formed therein at locations corresponding to and opposite to said scoring tools;
   the longitudinal axes of said grooves being offset relative to the longitudinal axes of said scoring tools;
   means for heating said scoring tools to less than the melting temperature of said thermoplastic sheet; and
   means for moving said heated scoring tools into engagement with said thermoplastic sheet to soften said thermoplastic sheet so that is is deformed on its upper surface by said scoring tools and so that it is deformed on its lower surface by the grooves in said plate, said deformed areas forming said flexible fold lines in said thermoplastic sheet.

2. Apparatus in accordance with claim 1 further including tools for die cutting said thermoplastic sheet.

3. Apparatus in accordance with claim 2 wherein said grooved plate acts as a bed for receiving said die cutting tools.

4. Apparatus in accordance with claim 1 wherein said scoring tools are shorter than said die-cutting tools.

5. Apparatus in accordance with claim 1 wherein said scoring tools are connected to said heating means for heating said scoring tools to just below the melting temperature of said thermoplastic sheet.

6. Apparatus in accordance with claim 1 wherein the longitudinal axes of said grooves are disposed at a 45 degree angle to the longitudinal axis of said scoring tool.

7. Apparatus in accordance with claim 1 wherein said grooves have a width of 0.020 inches at their widest point and a depth of 0.015 inches.

8. Apparatus in accordance with claim 2 wherein said scoring tools are shorter than said die cutting tools.

* * * * *